United States Patent [19]

Higuchi et al.

[11] 4,298,564
[45] Nov. 3, 1981

[54] DIE FOR EXTRUDING A HONEYCOMB STRUCTURAL BODY AND A METHOD OF EXTRUDING THE SAME

[75] Inventors: Noboru Higuchi, Nagoya; Shoji Futamura, Kawasaki, both of Japan

[73] Assignees: NGK Insulators, Ltd., Nagoya; Institute of Technology Precision Electrical Discharge Works, Kawasaki, both of Japan

[21] Appl. No.: 901,227

[22] Filed: Apr. 28, 1978

[30] Foreign Application Priority Data

May 4, 1977 [JP] Japan .................................. 52-51790

[51] Int. Cl.³ .............................................. B29F 3/00
[52] U.S. Cl. ............................ 264/177 R; 264/209.1;
425/199; 425/382 R; 425/464
[58] Field of Search .............. 425/464, 461, 382, 198, 425/199; 264/177 R, 209; 29/407, 423; 428/116

[56] References Cited

U.S. PATENT DOCUMENTS

| | | | |
|---|---|---|---|
| 3,380,128 | 4/1968 | Cremer et al. | 425/382 |
| 3,790,654 | 2/1974 | Bagley | 264/209 |
| 3,824,196 | 7/1974 | Benbow et al. | 252/455 R |
| 3,826,603 | 7/1974 | Wiley | 425/461 |
| 3,846,197 | 11/1974 | Wiley | 156/11 |
| 3,981,657 | 9/1976 | Orso et al. | 425/464 |
| 3,983,283 | 9/1976 | Bagley | 425/461 |
| 4,041,597 | 8/1977 | Folmar et al. | 425/464 |
| 4,118,456 | 10/1978 | Blanding et al. | 264/177 F |
| 4,163,640 | 8/1979 | Higuchi | 264/177 R |
| 4,168,944 | 9/1979 | Mirikawa et al. | 425/464 |
| 4,178,145 | 12/1979 | Hamamoto et al. | 425/467 |

FOREIGN PATENT DOCUMENTS

| | | | |
|---|---|---|---|
| 1050990 | 2/1959 | Fed. Rep. of Germany | 425/382 |
| 2421277 | 11/1974 | Fed. Rep. of Germany | 264/177 F |
| 50-34351 | 4/1975 | Japan | 425/461 |

*Primary Examiner*—Jay H. Woo
*Attorney, Agent, or Firm*—Stephens, Davis, Miller & Mosher

[57] ABSTRACT

A die for extruding a honeycomb structural body, all parts of which are uniform in mechanical strength, is disclosed. The die is provided with guide grooves between discharge slits and feed inlets for raw stock, said discharge slits having a cross-sectional shape corresponding to that of the honeycomb structural body and said guide grooves having a cross-sectional area larger than that of the discharge slits.

4 Claims, 9 Drawing Figures

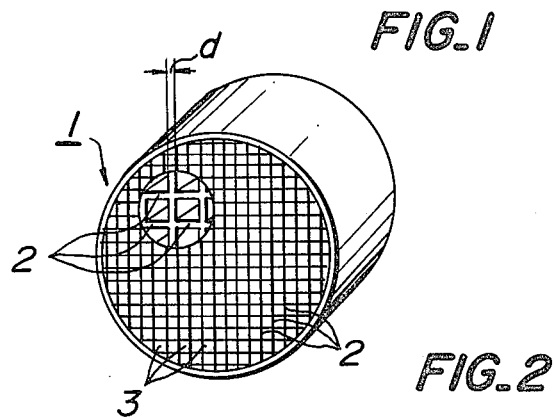
FIG._1
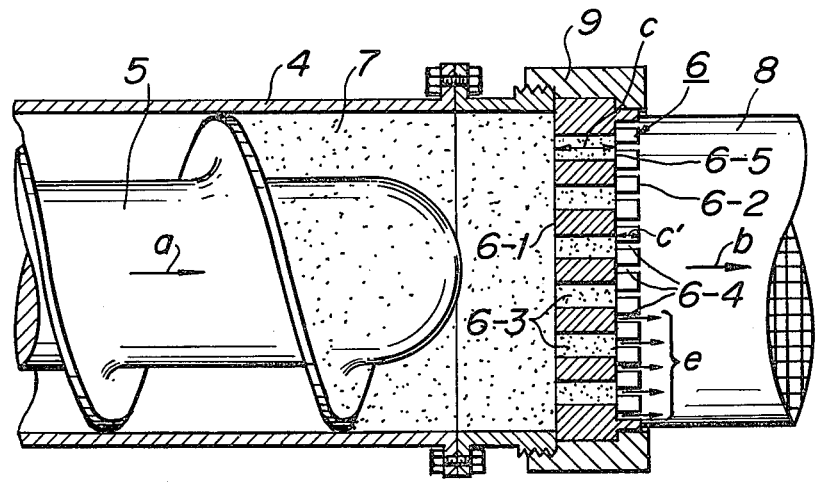
FIG._2
FIG._3A
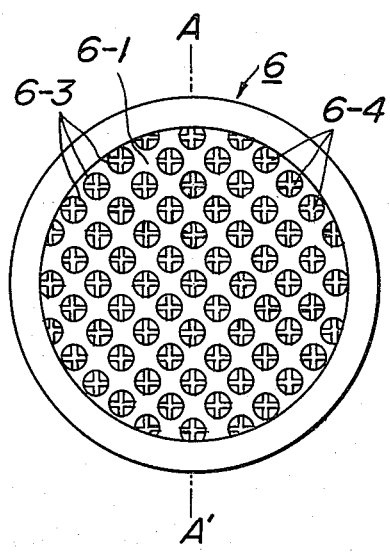
FIG._3B
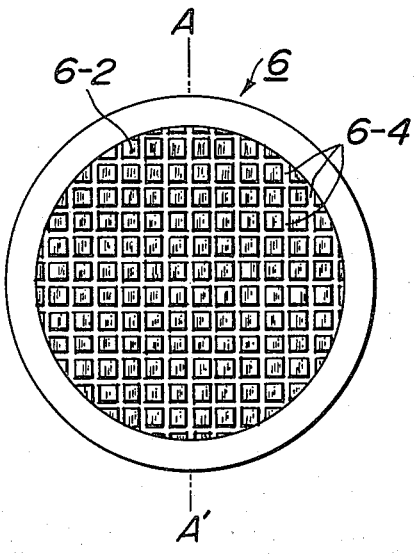

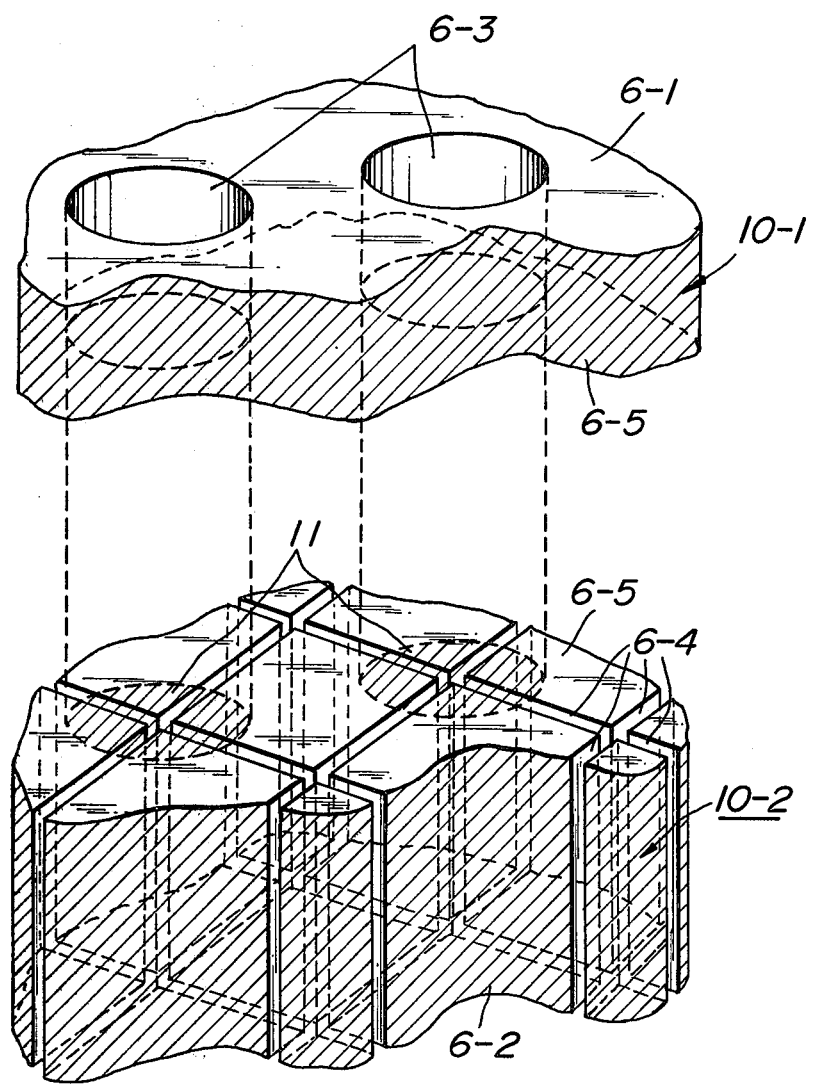
FIG_3C

DIE FOR EXTRUDING A HONEYCOMB STRUCTURAL BODY AND A METHOD OF EXTRUDING THE SAME

The present invention relates to a die for extruding a honeycomb structural body, and more particularly relates to a die for extruding a honeycomb structural body, all parts of which are uniform in mechanical strength, and a method for extruding the honeycomb structural body.

For a better understanding of the invention, reference is taken to the accompanying drawings, in which:

FIG. 1 is a perspective view of a honeycomb structural body for explaining the general conception of the structure, a part of which is enlarged;

FIG. 2 is a front elevational view, partly in section, of an extruder using a die for extruding a honeycomb structural body;

FIGS. 3A, 3B and 3C show one embodiment of conventional dies for extruding a honeycomb structural body.

Figure 4A:
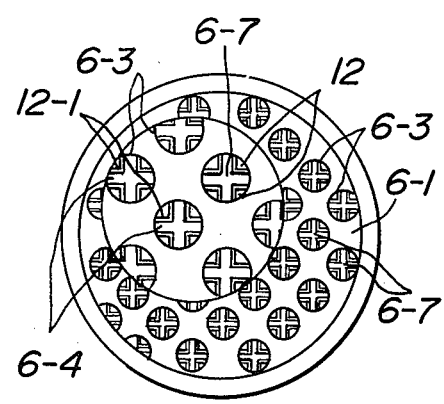
FIGS. 4A, 4B, 4C and 4D show one embodiment of dies for extruding a honeycomb structural body according to the present invention.

A purifying member in an exhaust gas-purifying apparatus of automobile has generally a structure shown in FIG. 1. In FIG. 1, the numeral 1 represents a purifying member, such as a honeycomb structural body, the numeral 2 represents a partition wall, and the numeral 3 represents cells formed by the partition walls and extending through the honeycomb structure 1, the cells being square in cross-section. The partition wall 2 is generally made of heat-resistant and corrosion-resistant ceramics and has a thickness of about 0.05–5 mm (d in FIG. 1).

A honeycomb structural body to be used as a purifying member of this kind is generally produced by the continuous extrusion by means of an extruder having a structure shown in FIG. 2. In FIG. 2, the numeral 4 represents a cylinder, the numeral 5 represents an extrusion means, for example, a screw which moves in the arrow direction shown in FIG. 2 while rotating, and the numeral 6 represents a die for extruding a raw stock 7, for example, ceramic batch, into a honeycomb structural body 8 composed of cells having a predetermined cross-sectional shape. The raw stock 7 is forcedly fed into a cylinder 4 towards the die 6 by means of an extrusion means 5, and the honeycomb structural body 8 to be used as a purifying member 1 shown in FIG. 1 is extruded from the die 6 in the arrow direction b shown in FIG. 2. The numeral 9 represents a connecting means which connects the cylinder 4 and the die 6 and holds them.

The die 6 used in the conventional extrusion apparatus of this kind generally has a structure shown in FIG. 3A when viewed from the cylinder 4 side, and a structure shown in FIG. 3B when viewed from the honeycomb structural body 8 side. The cross-section of the die taken on the line a—a' in FIGS. 3A and 3B has a structure shown in FIG. 2. That is, the die 6 has a plurality of independent feed inlets, for example, circular holes 6-3, which are bored in the die up to a given depth (shown by c in FIG. 2) from its rear surface 6-1 to its front surface 6-2 side, and further has discharge slits 6-4 formed in the die up to a given depth (shown by c' in FIG. 2) from its front surface 6-2 to its rear surface 6-1 side, said discharge slits having a cross-sectional shape corresponding to the cross-sectional shape of the cell of the honeycomb structural body 8. The above described circular holes 6-3 and discharge slits 6-4 are communicated to each other and made integral into one body on an imaginary plane 6-5. FIG. 3C is a perspective view of the die 6, which is divided into two parts by the imaginary plane 6-5 for the easiness of the explanation of the relation between the circular holes 6-3 and the discharge slits 6-4. The die 6 is composed of a first core block 10-1 and a second core block 10-2. In FIG. 3C, the numeral 11 shows a joint plane of the circular holes 6-3 and the discharge slits 6-4. Other numerals are same as those designated in FIG. 2. In FIG. 3C, the first core block 10-1 is arranged on the plane 6-5 of the second core block 10-2 so that the center line of a circular hole 6-3 is positioned at the intersecting point of discharge slits 6-4, and forms a die together with the second core block 10-2. That is, the first and second core blocks 10-1 and 10-2 are not practically independent, but circular holes 6-3 are bored from one surface 6-1 of a block and discharge slits are cut from another surface 6-2 of the block to form a die 6.

When a raw stock 7 is forcedly supplied into the thus formed die 6, the raw stock 7 is forcedly flowed in the circular hole 6-3 towards the discharge slit 6-4 side and reaches the joint surface 11 shown in FIG. 3C. The raw stock 7 reaching the joint surface 11 is flowed into the discharge slit 6-4 through the joint surface 11 (referred to as region α). In this case, the raw stock 7 is flowed into the discharge slit 6-4 as shown by the arrow e in FIG. 2. That is, the raw stock 7 passed through the above described region α is forcedly flowed substantially straightly along the extrusion direction into the discharge slit 6-4, which is directly opposed to the region α, and at the same time the raw stock 7 is also flowed into the discharge slit 6-4, which is not directly opposed to the region α, and is forcedly supplied into four intersecting positions adjacent to an intersecting position of discharge slits, the latter intersecting position being directly opposed to the circular hole 6-3. However, the raw stock 7 is forcedly flowed under relatively high pressure into the discharge slit directly opposed to the above described region α, but is forcedly flowed under relatively low pressure into the discharge slit not directly opposed to the region α. Therefore, the extruded honeycomb structural body 8 is not uniform in the mechanical strength and cracks or is broken at the portions having poor mechanical strength during the drying step and firing step followed to the extrusion.

The object of the present invention is to overcome the above described drawbacks, and to provide a die capable of extruding a honeycomb structural body having a uniform and high mechanical strength.

The present invention will be explained in more detail referring to FIGS. 4A, 4B, 4C and 4D.

FIGS. 4A, 4B, 4C and 4D show one embodiment of the dies according to the present invention.

Figure 4B:
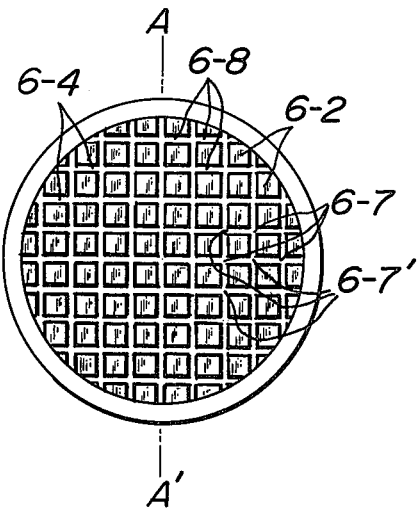
Figure 4C:
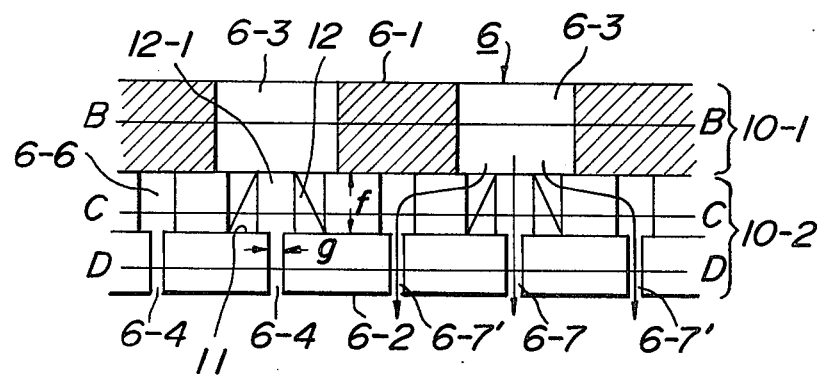
Figure 4D:
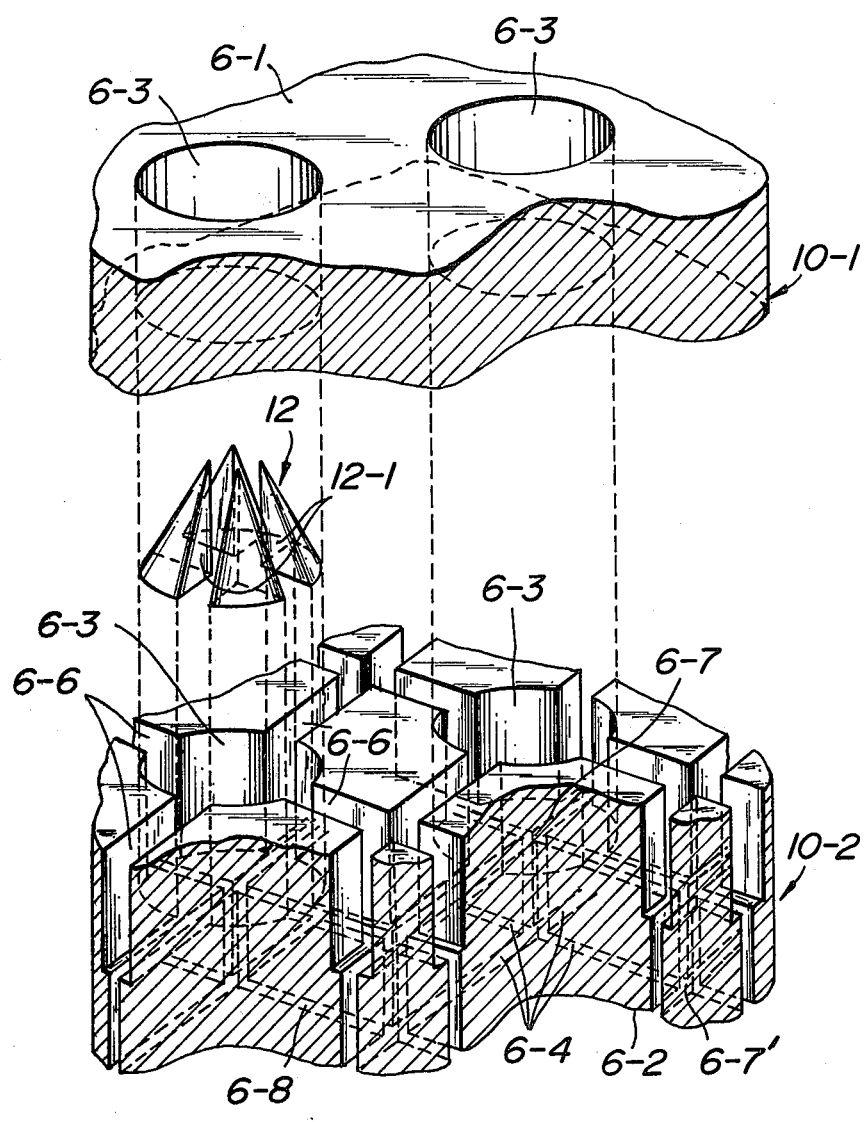

FIG. 4A is a rear view of the die according to the present invention;

FIG. 4B is a front view of the die according to the present invention;

FIG. 4C is a cross-sectional view of the essential part of the die according to the present invention taken on the line A—A' in FIG. 4B; and FIG. 4D is a perspective view of the essential part of the die according to the present invention, which is divided into three parts for the ease of explanation of the die.

In FIGS. 4A–4D, the numeral 6 represents a die for extruding a honeycomb structural body, the numeral 6-1 represents the rear surface of the die, the numeral 6-2: the front surface of the die, the numeral 6-3: a feed inlet, for example, a circular hole, the numeral 6-4: a discharge slit, the numeral 6-6: a guide groove, the numeral 6-7: an intersecting portion of discharge slits 6-4, said intersecting portion being directly opposed to the circular hole 6-3, the numeral 6-7': an intersecting portion of discharge slits 6-4, said intersecting portion being not directly opposed to the circular hole 6-3, the numeral 6-8: an edge portion of a discharge slit 6-4, the numeral 10-1: a first core block, the numeral 10-2: a second core block, the numeral 11: a joint surface of the circular hole 6-3 and the discharge slit 6-4, the numeral 12: a resistor, for example, a conical body and the numeral 12: a guide groove in the resistor.

In the die according to the present invention, as seen from the perspective view of the second core block 10-2 in FIG. 4D, guide grooves 6-6 having a given depth (shown by f in FIG. 4C) are formed from the imaginary plane inclusive of the joint surface 11 of the circular hole 6-3 and discharge slit 6-4 towards the rear surface 6-1 side of the die. In this case, the guide groove 6-6 is arranged so as to be opposed to the discharge slit 6-4 and has a width larger than the width (shown by g in FIG. 4C) of the discharge slit 6-4. The resistor 12 is arranged on the joint surface 11 and has a bottom surface having, for example, the same radius as that of the joint surface 11. The guide groove 12-1 in the resistor 12 is formed so as to be opposed to the discharge slit included in the joint surface 11 and has the same width as that of the guide groove 6-6. Supposing that the total cross-sectional area of a plurality of the circular holes 6-3 of the die taken on the line B—B in FIG. 4C is $S_1$, that the total cross-sectional area of the guide grooves 6-6 of the die taken on the line C—C in FIG. 4C is $S_2$, and that the total cross-sectional area of the discharge slits 6-4 of the die taken on the line D—D in FIG. 4C is $S_3$, then the relation of $S_3 < S_2$ must be satisfied. In this case, it is preferable that the relation of $S_1 < S_2$ is satisfied at the same time. In the die of the present invention, the relation between $S_1$, $S_2$ and $S_3$ is preferred to be, for example, $S_1:S_2:S_3 = 1.2:4:1$.

Further, the conical resistor 12 arranged on the joint surface 11 can be formed by boring the die by means of, for example, a drill having a shape corresponding to the conical shape and provided at its tip with a hollow part (reverse conical drill), and the guide groove 6-6 can be formed together with the discharge slit 6-4 by means of, for example, the linear electrode electrical discharge machining.

When a die 6 having the above described structure is used in the extrusion apparatus shown in FIG. 2, the flow of a raw stock 7 forcedly supplied into the circular hole 6-3 is flowed into the guide grooves 6-6 and stored in the guide grooves 6-6. The raw stock 7 is then squeezed and flowed into the discharge slits 6-4. In the optimum die, a resistor 12 having resistor guide grooves 12-1 is arranged at the intersecting portion of the guide grooves 6-6 as shown in FIG. 4C and 4D, and the raw stock 7, which will be flowed into the discharge slit directly opposed to the circular hole 6-3, is subjected to resistance by the above described resister 12.

As described above, in the die of the present invention, the raw stock 7 forcedly supplied into the circular hole 6-3 is spread in the lateral direction by means of the guide groove 6-6, and stored therein. The material 7 once stored in the guide groove 6-6 is forcedly supplied into the discharge slit 6-4, and at the same time, the raw stock 7, which is flowed into the discharge slit directly opposed to the circular hole 6-3, is subjected to resistance by means of the resistor 12. Therefore, the extrusion velocity of raw stock 7 passed through the discharge slit, which is directly opposed to the circular hole 6-3, is substantially the same as that of raw stock 7 passed through the discharge slit, which is not directly opposed to the circular hole 6-3. That is, a honeycomb structural body 8 is extruded in substantially the same extrusion velocity in all portions.

In the above described FIG. 4D, the blocks 10-1 and 10-2 and the resistor 12 are shown in a separated form, but of course they can be integrally formed. That is, the above described circular hole, discharge slit, guide groove and resistor guide groove are preferred to be formed in one block.

As described above, according to the present invention, a honeycomb structural body having a uniform mechanical strength in all parts, that is, a strong honeycomb structural body, can be extruded. The above described example has explained the extrusion of a honeycomb structural body composed of cells having a square cross-section, but of course the present invention can be applied in the extrusion of, for example, a honeycomb structural body composed of cells having a regular triangular, regular hexagonal or regular octagonal cross-sectional shape without limiting to the honeycomb structural body composed of cells having a square cross-sectional shape. Further, of course, it is not necessary to arrange the feed inlet so as to be opposed to the intersecting portion of the discharge slits, but the feed inlet may be arranged so as to be opposed to the edge portion of the discharge slit.

What is claimed is:

1. In a method of extruding a honeycomb structural body, wherein a raw stock is forcedly supplied into a plurality of feed inlets, which are formed independently from each other in a die, and then extruded from discharge slits, said slits intersecting one another, formed in the die, and wherein each of said feed inlets is opposed to one of said intersections, the improvement comprising storing the raw stock in guide channels formed between the feed inlets and discharge slits and having a width larger than the width of the discharge slits, said guide channels having a cross-sectional area larger than the cross-section area of the discharge slits, and then flowing forcedly the raw stock into the discharge slits.

2. In a die for extruding a honeycomb structural body provided with discharge slits intersecting in a cross-sectional shape corresponding to the cross-sectional shape of the honeycomb structural body, and having a given depth towards the rear surface side of the die from the front surface thereof, and a plurality of feed inlets, which are formed independently from each other extending from the rear surface of the die towards the front surface side thereof and are communicated to the above described discharge slits, each of said feed inlets being opposed to one of said intersections, the improvement comprising guide channels having a given depth towards the rear surface side of the die from an imaginary plane inclusive of the joint surface of the above described discharge slits and feed inlets and having a width larger than the width of the discharge slits, said guide channels further having a cross-sectional area larger than that of the above described discharge slits.

3. A die for extruding a honeycomb structural body according to claim 1, wherein said guide groove is provided with a resister arranged on the joint surface towards the rear surface side of the die from the above described joint surface, and the resister has resister guide grooves having a cross-sectional shape corresponding to the cross-sectional shape of the above described guide groove, said resister guide grooves being extended from the joint surface towards the rear surface side of the die.

4. A die for extruding a honeycomb structural body according to claim 3, wherein said resister is a conical body arranged in opposition to the feed inlet.

* * * * *